(No Model.) 2 Sheets—Sheet 2.
C. HAGMAIER.
APPARATUS FOR REGULATING THE SPEED OF WATER WHEELS.
No. 498,714. Patented May 30, 1893.
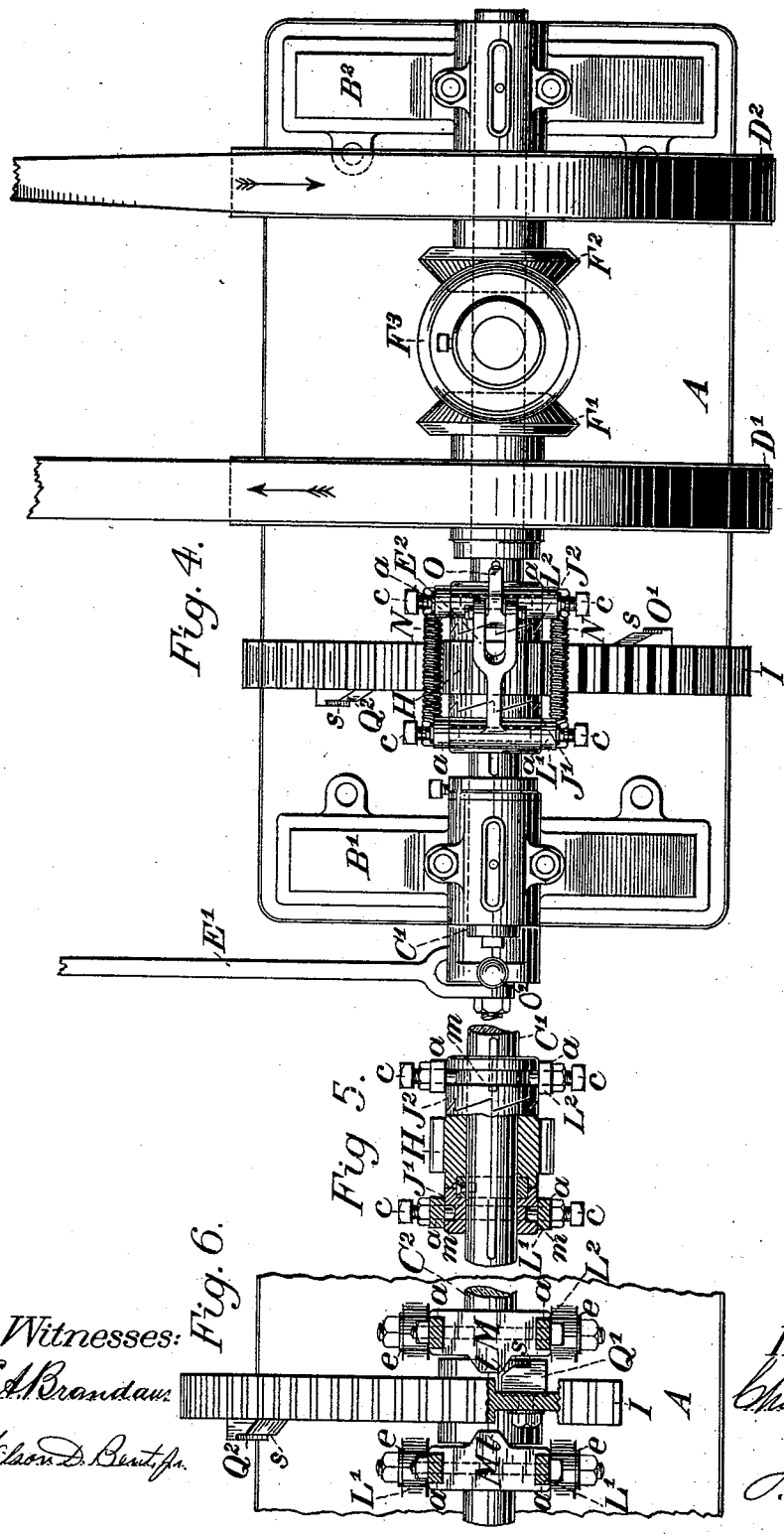
Witnesses:
E. A. Brandau
Wilson D. Bentz Jr.
Inventor:
Chas. Hagmaier
J. Richards
Att'y

UNITED STATES PATENT OFFICE.

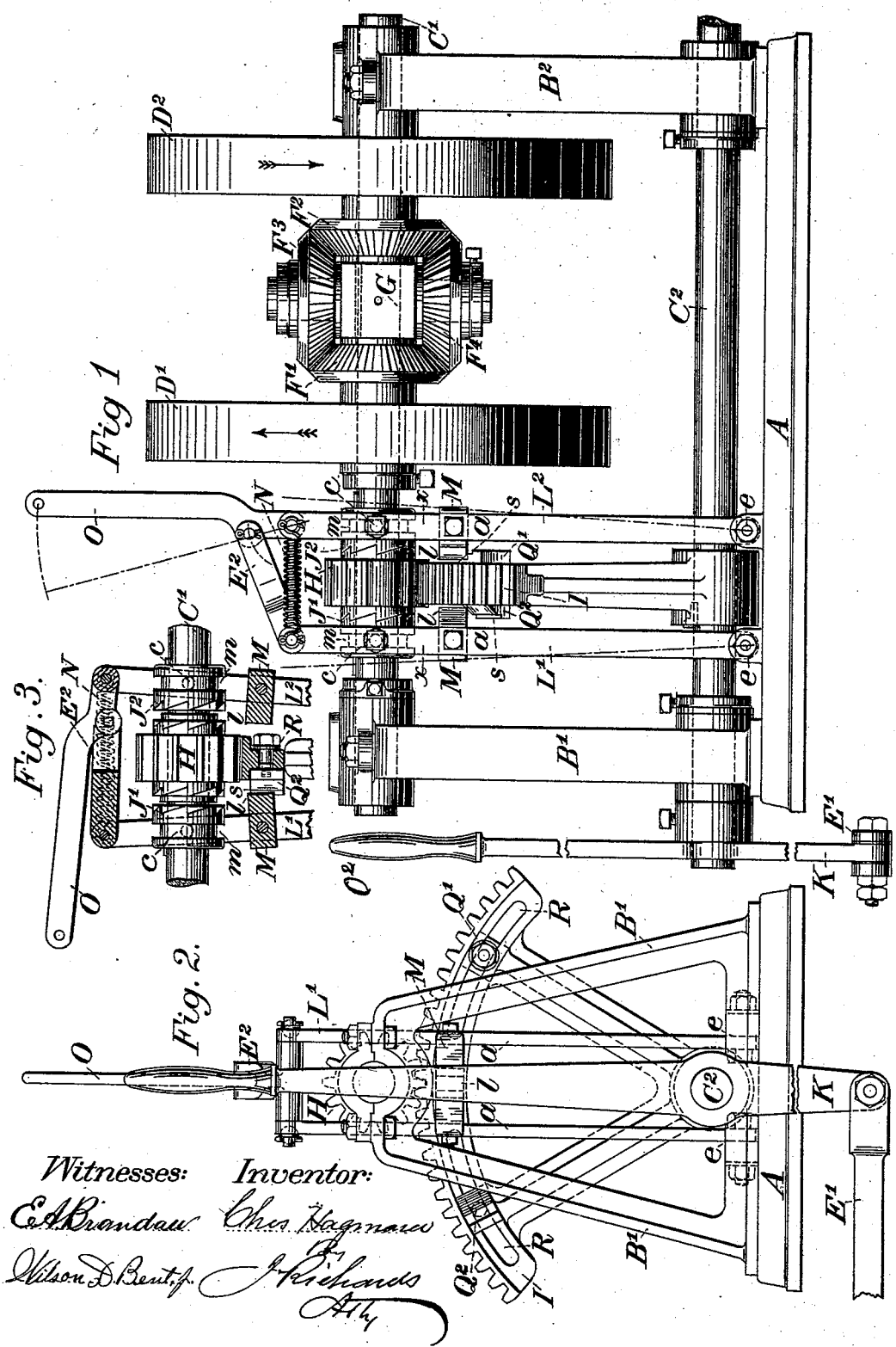

CHARLES HAGMAIER, OF SAN FRANCISCO, CALIFORNIA, ASSIGNOR OF ONE-HALF TO THE PELTON WATER WHEEL COMPANY, OF SAME PLACE.

APPARATUS FOR REGULATING THE SPEED OF WATER-WHEELS.

SPECIFICATION forming part of Letters Patent No. 498,714, dated May 30, 1893.

Application filed January 9, 1893. Serial No. 457,836. (No model.)

*To all whom it may concern:*

Be it known that I, CHARLES HAGMAIER, a citizen of the United States, residing in the city and county of San Francisco, State of California, have invented certain new and useful Improvements in Apparatus for Regulating the Speed of Water-Wheels; and I hereby declare that the following specification and the drawings therewith constitute a full, clear, and exact description of my invention.

My invention relates to governing or regulating the speed of water wheels, by adjustment of the supply of water, altering its course, offering resistance by brakes, or otherwise, employing for the actuating power and movement, the relation between the speed of the motor, or water wheel itself, and some other independently-driven motor or gearing, and belongs to the class commonly called differential governors.

My improvements consist in so constructing such apparatus that the range of the controlling movement each way, for accelerating or retarding the speed of the water wheel, will be limited and automatically disengaged, and when reversed will be again automatically engaged; also in supplemental means of disengaging the governing or controlling mechanism, so the valve, or other immediate means of controlling the speed of the wheel, can be operated by hand, and in certain devices thereto directed.

The objects of my invention are to prevent over-running of the governing or regulating mechanism each way, and to provide convenient means of both automatic and hand adjustment of the same, as set forth in the description to follow, and the drawings, in which—

Figure 1 is a side view of my improved apparatus. Fig. 2 is an end view of the same. Fig. 3 is a detail of Figs. 1 and 2, showing the clutches disengaged. Fig. 4 is a plan view of Fig. 1. Fig. 5 is a detail of Fig. 4, partially in section, to better explain the construction of various parts. Fig. 6 is a section on line $x\ x$ of Fig. 1.

Similar letters of reference are employed to designate like parts in the different figures of the drawings.

A is a main sole plate on which all the operating parts are mounted.

$B'$ and $B^2$ are standards bolted to the plate, having bearings in each for the shafts $C'\ C^2$. The lower shaft $C^2$ is connected by the crank K and link $E'$ or other suitable gearing, with gates, valves, or adjustable nozzles controlling the supply of water to a water wheel, the speed of which is to be regulated. In the case of tangential or impulse water wheels this link can be so connected to the nozzle as to move the latter with respect to the wheel's radius and thus control the speed, or the link may connect to and operate a brake for retardation, so as to absorb the power above the normal resistance to the water wheel and thus regulate the speed, the effect being in all cases to maintain uniform motion. The shaft $C^2$ is actuated in the following manner: On the upper shaft $C'$ are mounted loosely two pulleys $D'\ D^2$, revolving in opposite directions, as indicated by arrows. One of these pulleys, $D'$ for example, is connected by a band, or other suitable means, with the shaft of the water wheel to be controlled, or other gearing connected therewith, so the pulley will have at all times a velocity of movement corresponding to that of the water wheel to be governed. The other pulley $D^2$ is similarly connected with some independent motor, that has by its conditions of operating a uniform speed or velocity, a second water wheel for example, that has uniform resistance, or one specially provided that has no other function than operating the controlling mechanism herein shown. This pulley may also be connected to machinery impelled by a steam engine, the requirement being only that of uniform motion so that any variation of speed between the water wheel to be controlled and of this independent motor, will cause a corresponding change in the relative positions of the pulleys $D'\ D^2$. These pulleys may, when circumstances admit, be substituted by tooth wheels. Belts and pulleys are shown because in most cases this method of connecting is more convenient, and is positive enough to operate the water-wheel controlling devices with sufficient accuracy.

Mounted on the shaft $C'$ between the two pulleys D' D² are four gear wheels F' F² F³ and F⁴. The wheels F' F² are mounted loosely and are attached to and revolve with the pulleys D' D². The other two wheels F³ F⁴ are mounted loosely on studs formed integrally with the member G which is keyed fast to the shaft C'. It will be understood that when the pulleys D' D² are moving at a uniform velocity in opposite directions, the four gear wheels revolve together without movement of the member G or the shaft C', but as soon as there is any change in the relative velocity of the pulleys D' D², there is a corresponding change in the position of the two wheels F³ F⁴, and an equal rotative movement of the member G and of the shaft C'. In this manner it will be seen that any change in the velocity of the water wheel to be controlled, and consequently of the pulley D', at once revolves the shaft C' to the right or left as the change of speed may be faster or slower. On this shaft C' is mounted loosely a spur pinion H, meshing into the quadrant or sector I, keyed on the lower shaft C². This pinion H is engaged at each side by the claw clutches J' J², one being right and the other left hand, so that motion of the shaft C' may be in either direction; all movements, as well as the mechanism, being dual, and operating inversely as the motion is to increase or retard the water wheel to be controlled. The clutches J' J² slide loosely on keys fitted in the shaft C', and impart any movement of the latter, right or left, to the pinion H, the sector I, and the shaft C², acting from these through the crank K and link E', or other suitable connection to the gate, valve, nozzle or other mechanism controlling the water-wheel's speed. The clutches J' J² are moved by the levers L' L², consisting, in this case, and for the convenience of construction, of two members a a pivoted at e, and connected by a cross piece at M, as shown in Figs. 1, 2 and 3. These levers L' L² have pivot screws c c fitting into grooves m m in the collars J' J², in the usual manner, as shown in Figs. 3 and 5. These levers L' L² are drawn together, and the clutches J' J², engaged by means of coiled springs N N, and may be, when required, disengaged simultaneously by the lever O and link E², forming a toggle joint, and spreading the levers apart, as shown in Fig. 3, where the lever O is depressed and both clutches J' J² are open. In this position, the pinion H and sector I, being free, the shaft C² can be turned to the right or left by the hand lever O² independent of the controlling mechanism on the shaft C'. This is both convenient and necessary in starting and controlling the water wheel to be regulated, and for various reasons that do not require further explanation.

Coming now to the manner of operating: If the pulley D' is retarded by reason of the water wheel to be controlled moving too slow, then the member G and shaft C' are turned in the opposite direction, and the clutch J engages and turns the pinion H. The other clutch J², by reason of its beveled teeth and the spring N, is thrown out of gear, and the claw teeth slide over each other, while the segment I and shaft C' are turned by the clutch J', until the link E', acting on the water wheel gate or valve, produces a normal speed, when the pulleys D' D² will again move at the same velocity. If, on the other hand, the water wheel and pulley D' move too fast, the clutch J² is engaged, and the shaft C' is revolved in the opposite direction, the lower shaft C² moved in the opposite direction, and until the normal speed of the water wheel is again restored. If, however, by the change of resistance, or other circumstance, the link E' is moved too far, or beyond its normal range, the stops Q' Q², on the sector I, come in contact with the crossbars M on the levers L' L², and disengage one or the other of the clutches J' or J², as the movement may be right or left. These stops Q' Q² are held by screws passing through and sliding in the slot R in the sector I, so they can be set at various points, and thus control the range of the sector, and thereby the range of the crank K and link E' as before explained. These stops Q' Q² also act as detents by means of the ledges s on their extreme ends that prevent the stops from passing the bars M, and thus permitting the clutches J' J² to re-engage, if by chance the sector I overruns its required range. In this manner, it will be seen the range of action for the controlling mechanism is adjustable, its engagement and release automatic, also controllable by hand, and that no accident can occur by overrunning. It will also be obvious that, while I have shown specific mechanism applying to my invention to water wheels, many parts can be modified without departure from the manner of operating. For example, the pulleys D' D² can be substituted by tooth gearing; the springs to engage the clutches may be deflecting instead of coiled, or the sector I can, if required, be substituted by a straight rack engaging the pinion H, and extending thence to a gate, valve or nozzle of a water wheel, the manner of operating remaining the same.

Having thus described the nature and objects of my invention and the manner of applying the same, what I claim as new, and desire to secure by Letters Patent, is—

1. In water-wheel regulating apparatus, the pulleys and gearing, as herein described, in combination with right and left claw clutches, a loose pinion and toothed sector or rack, so arranged that the clutches engage right and left by means of springs, and the direction of their rotation, independent of any direct adjustment caused by speed of the water wheel governed, in the manner substantially as and for the purposes set forth and described.

2. In water-wheel regulating apparatus, two pulleys connected by gearing as herein shown and described, so that variation of their relative speed will cause a rotation, right or left, of the shaft on which they are mounted;

claw clutches on the same shaft engaging right or left as the motion of the shaft may determine, the acting clutch held in mesh by means of a spring that will permit the other clutch to slide free as the direction of rotation may determine, in the manner substantially as and for the purposes described.

3. In water-wheel regulating apparatus, as herein described, two pulleys or wheels loosely mounted, revolving in opposite directions, connected by gearing as herein shown, a loose pinion on the same shaft, meshing into a sector or rack; right and left claw clutches for connecting the pinion and shaft on which the clutches are mounted; springs to close the clutches and adjustable stops to disengage the same and determine the range of movement of the sector or rack, combined and operating in the manner and for the purposes substantially as described.

4. In water-wheel regulating apparatus, a shaft turning to the right or left by means of the differential movement of two pulleys or wheels thereon, driven from independent motors; a loose pinion on the shaft engaged right and left by claw clutches in the manner described. The clutches engaged by springs and disengaged by stops on the sector or rack operated by the pinion; a lever and toggle gearing to open and hold the clutches out of gear when required, in the manner substantially as and for the purposes specified.

5. In water-wheel regulating apparatus, as herein described, two pulleys or wheels revolving in opposite directions, one driven by the water wheel to be controlled and the other by an independent motor; gearing connecting these wheels in the manner described, so that any difference in their relative velocity is imparted to the shaft on which they are loosely mounted, a tooth pinion on the same shaft connecting therewith by means of right and left claw clutches, a toothed sector or rack meshing into the pinion and provided with adjustable stops, that will disengage the clutches and determine the range of movement each way, in the manner substantially as described.

6. In water-wheel regulating apparatus as herein described, wheels or pulleys mounted and geared as shown, connected by clutches with a toothed sector or rack for operating the gate or valve of a water wheel; springs to close, and a toggle lever to open the clutches, and a hand lever to operate the sector or rack, so the water-wheel gate or valve can be disengaged from the clutches and operated by hand in stopping, starting, or for other purposes, in the manner substantially as and for the purposes described.

7. In water-wheel regulating apparatus as herein described, a shaft having two wheels or pulleys driven in opposite directions and connected by gearing in the manner described, right and left claw clutches communicating the variations of movement between the two wheels or pulleys to a pinion on the shaft on which the wheels or pulleys are loosely mounted; a parallel shaft operated by a tooth sector meshing into the pinion; springs to close the clutches, and adjustable stops to disengage them at some predetermined range of the tooth sector, and hand disengaging gearing to open and hold the clutches disengaged so the water-wheel gate, valve or nozzle, can be operated by hand independent of the differential gearing, in the manner and for the purposes described.

In testimony whereof I have hereunto affixed my signature in the presence of two witnesses.

CHARLES HAGMAIER.

Witnesses:
JOSEPH V. KUNZE,
DAVID DONZEL.